US006565047B1

(12) United States Patent
Cheung (10) Patent No.: US 6,565,047 B1
(45) Date of Patent: May 20, 2003

(54) STAND AND METHOD FOR DISPLAYING A WREATH

(75) Inventor: Ka (Michael) Wai Cheung, Kowloon (HK)

(73) Assignee: Atico International USA, Inc., Ft. Lauderdale, FL (US)

( * ) Notice: Subject to any disclaimer, the term of this patent is extended or adjusted under 35 U.S.C. 154(b) by 0 days.

(21) Appl. No.: 10/035,152

(22) Filed: Jan. 4, 2002

(51) Int. Cl.$^7$ .................................................. A47G 7/00
(52) U.S. Cl. .................................. 248/27.8; 248/346.03
(58) Field of Search .............................. 248/27.8, 175, 248/346.01, 346.03, 153

(56) References Cited

U.S. PATENT DOCUMENTS

| | | | | |
|---|---|---|---|---|
| 2,716,827 A | * | 9/1955 | Mixter | 248/27.8 |
| 5,553,823 A | | 9/1996 | Protz, Jr. | |
| D374,168 S | | 10/1996 | Protz, Jr. | |
| 6,311,851 B1 | | 11/2001 | Knudsen, Sr. et al. | |
| 6,398,058 B1 | * | 6/2002 | Walsh | 220/485 |

* cited by examiner

Primary Examiner—Leslie A. Braun
Assistant Examiner—A. Joseph Wujciak
(74) Attorney, Agent, or Firm—Gibbons, Del Deo, Dolan, Griffinger & Vecchione (57) ABSTRACT

A stand for displaying a decorative wreath, comprising (a) a substantially rectangular base; (b) two substantially vertical wreath support arms, each having a support attachment arm attached to the back edge of the base, a support extension that is continuous with the support attachment arm and extends therefrom in an upward direction, and a wreath attachment arm that is continuous with the support extension; (c) a substantially rectangular stabilizing frame arrayed above the base by a distance sufficient to stabilize the stand when the wreath is displayed in the substantially vertical display alignment in conjunction therewith; (d) a plurality of stabilizing rods extending between the base and the stabilizing frame and connecting the frame to the base; and (e) a wreath stabilizing brace securably attached to the stabilizing frame and comprising (i) a brace attachment bar securably attached to the front edge of the frame and extending therefrom to the back edge thereof, (ii) a brace attachment arm that is continuous with the brace attachment bar and is perpendicular to the frame and the base, and (iii) a wreath stabilizing arm attached to the brace attachment arm and extending therefrom above the frame by a distance sufficient to stabilize the bottom of the wreath in the substantially vertical display alignment. The base is configured to sit on a flat surface. The width of the base is sufficient to support the wreath in the substantially vertical alignment when the wreath is displayed in conjunction with the stand. The stabilizing rods further stabilize the stand when a wreath is displayed in conjunction therewith. Each of the support arms supports one lateral side of the wreath in the substantially vertical display alignment.

12 Claims, 5 Drawing Sheets

STAND AND METHOD FOR DISPLAYING A WREATH

BACKGROUND OF THE INVENTION

1. Field of the Invention

The present invention relates to a stand and method for displaying decorative wreaths, and more particularly pertains to a stand for displaying decorative wreaths for use as table decorations and a method for so displaying such wreaths.

2. Discussion of the Related Art

Devices for displaying decorative wreaths are known. Conventionally, wreaths are displayed by hanging them from doors or on walls, or mounting them thereon. Wreath mounting devices commonly include simple wall fasteners, such as nails, screws and hooks. Wreath hangers include the sectional wreath hanger as disclosed and claimed in U.S. Pat. Nos. 5,553,823 and D Pat. No. 374,168, both the Protz, Jr.; as well as the decorative wreath hanger disclosed and claimed in U.S. Pat. No. 6,311,851 to Knudsen, Sr., et al. Such devices all present the same limitation, namely, that only one side of the wreath may be displayed. That is, while one side of the wreath is visible by an observer, the other side of the wreath, facing the wall or door, is hidden. Accordingly, the full decorative potential of the wreath cannot be exploited. Further, wall-and-door wreath display devices also require either fixing the wreath to a wall or door and hanging the wreath therefrom. Accordingly, such devices do not provide for display of the wreath on tables, countertops or other similarly arrayed surfaces. The portability of the wreath also is compromised.

Wreath supporting devices include free-standing easels. Such devices have the advantage allowing the wreath to be displayed other than on a wall or door. However, easels are space-consuming and generally are unsuitable for displaying wreaths on tables and countertops. Additionally, while easels provide a certain portability, they are cumbersome and require the wreath to be removed from the easel for transport, or even for movement from one surface to another. Also, easels still obscure one side of the wreath, thereby preventing the full decorative potential of the wreath from being realized. Moreover, where the wreath is irregularly shaped, such as a valentine, it must be manipulated on the easel to stay in the most decorative position.

Other display devices support floral arrangements, including decorative wreaths, by attaching to the floral arrangement or decorative wreath at a central point at or near the bottom thereof. However, such devices are either limited to the size of wreath they can support without collapsing or having the wreath topple over or list to one side, or they are too large and/or heavy to be portable and useful for display on a tabletop or other similar surface.

What is needed is a stand for displaying a decorative wreath that allows both sides of the wreath to be seen. What is further needed is a stand for displaying a decorative wreath that allows the wreath to be displayed on a counter or tabletop or other flat surface. What is further needed is a stand for displaying a decorative wreath that allows a wreath to be displayed in a vertical alignment. What is further needed is a stand for displaying a decorative wreath that is portable. What is further needed is a method of displaying a decorative wreath that permits the entire decorative potential of the wreath to be viewed. What is further needed is a method of displaying a decorative wreath that permits the wreath to be displayed in a vertical alignment on a tabletop or counter or other horizontal flat surface.

Accordingly, the present invention provides a stand for displaying a decorative wreath that permits both sides of the wreath to be seen. The present invention further provides a stand for displaying a decorative wreath that allows the wreath to be displayed on a counter or tabletop or other flat surface. The present invention further provides a stand for displaying a decorative wreath that allows a wreath to be displayed in a vertical alignment. The present invention further provides a stand for displaying a decorative wreath that is portable. The present invention further provides a method of displaying a decorative wreath that permits the entire decorative potential of the wreath to be viewed. The present invention further provides a method of displaying a decorative wreath that permits the wreath to be displayed in a vertical alignment on a tabletop or counter of other horizontal flat surface.

BRIEF SUMMARY OF THE INVENTION

The wreath display stand of the present invention comprises a substantially rectangular base having a width, a depth, front and back edges, and two lateral edges; two substantially vertical wreath support arms, each further comprising a support attachment arm securably attached to a point on the back edge of the base and extending therefrom in a substantially horizontal manner toward the front edge of the base, a support extension that is continuous with the support attachment arm and extends vertically therefrom in an upward direction, and a wreath attachment arm that is continuous with the support extension at an end thereof that is opposite an end of the support extension that is continuous with the support attachment arm; a substantially rectangular stabilizing frame arrived above the base by a distance sufficient to stabilize the stand when the wreath is displayed in the substantially vertical display alignment in conjunction therewith, the frame also having a width, a depth, front and back edges, and two lateral edges; a plurality of stabilizing rods extending between the base and the stabilizing frame and connecting the frame to the base; and a wreath stabilizing brace securably attached to the stabilizing frame at a central point on the back edge thereof, the brace comprising a brace attachment bar having an end securably attached to a central point of the front edge of the frame and extending therefrom in a substantially horizontal plane to a central point of the back edge thereof, a brace attachment arm that is continuous with the brace attachment bar and is perpendicular to the frame and the base, and a wreath stabilizing arm attached to the brace attachment arm and extending therefrom in a substantially horizontal plane arrayed above and parallel to a plane of the frame by a distance sufficient to stabilize the bottom of the wreath in the substantially vertical display alignment, the wreath stabilizing arm further extending in a direction away from the back edge of the frame and toward the front edge thereof.

The base is configured to sit on a horizontal flat surface. The four edges of the base are arrayed in a common horizontal plane. The width of the base is sufficient to support the wreath in a substantially vertical display alignment when the wreath is displayed in conjunction with the stand.

The front and back edges and the lateral edges of the frame also are arrived in a common horizontal plane. The width of the frame is substantially identical to the width of the base; however, the depth of the frame is less than that of the base. The front edge of the frame is in a common vertical plane with the front edge of the base, and the lateral edges of the frame also are in common vertical planes with the lateral edges of the base. The second horizontal plane of the frame is substantially parallel to that of the base. The frame is securably attached to each of the vertical support arms at a point on the back edge of the frame.

Each of the wreath support arms is configured to support one lateral side of the wreath in the substantially vertical display alignment. Each of the stabilizing rods has a length and two ends. One end of each stabilizing rod is attached to an edge of the base, the other end being securably attached to the corresponding edge of the stabilizing frame. The length of each stabilizing rod is substantially equal to the distance that the stabilizing frame is arrayed above the base. The rods further stabilize the stand when the wreath is displayed in conjunction therewith.

In an alternate embodiment, the wreath support arms of the stand do not include support attachment arms. Rather an end of the support extension of each wreath support arm is securably attached to a point on either of the lateral edges of the base and extends vertically therefrom in an upward direction, the point of attachment being such that the support extensions of the wreath support arms also contact and are securably attached to the back edge of the frame. Further in this embodiment, the end of the brace attachment bar of the wreath stabilizing brace is attached, not to the front edge of the frame, but to a central point on the back edge of the base, extending therefrom in a substantially horizontal plane in the direction of the front edge of the base. The wreath stabilizing brace includes a second wreath stabilizing arm attached to the brace attachment arm and extending therefrom in a substantially horizontal plane arrayed between and parallel to the horizontal planes of the frame and base by a distance sufficient to further stabilize the bottom of the wreath in the vertical display alignment, the second wreath stabilizing arm further extending in a direction away from the back edge of the frame and toward the front edge thereof.

In a further alternate embodiment, the stand of the present invention also includes a cantilever wreath support permitting the wreath in conjunction with the stand to be displayed in the vertical display alignment on a pegboard. The cantilever wreath support further comprises a peg board bracing element attached to the peg board, a wreath support element that is continuous with the peg board bracing element and is perpendicular thereto, and a wreath bracing element that is continuous with the wreath support element at an end furthest from the peg board bracing element, and is perpendicular to the wreath support element. The wreath support element is configured such that, when the peg board bracing element is attached to the peg board, the wreath support element extends in a substantially horizontal manner in a direction away from the peg board. Also, the wreath bracing element extends vertically from the wreath support element in an upward direction. The wreath support element has a length sufficient to permit a wreath in its vertical display alignment in conjunction with the stand to be hung on the cantilever wreath support while maintaining the vertical display alignment. The length of the wreath bracing element is sufficient to prevent the wreath from falling off the wreath support element of the cantilever wreath support when the wreath in conjunction with the stand is hung thereon in the vertical display alignment.

The present invention also provides a method of displaying a decorative wreath, comprising the steps of: (a) placing the base of the display stand on a horizontal flat surface so that each of the support extensions of the vertical support arms of the stand extends vertically upward from its support attachment arm and the wreath stabilizing arm extends horizontally in a direction toward the front edge of the frame; (b) holding the wreath in a vertical alignment relative to the flat surface, with the center of the wreath substantially aligned with center points of the base and the frame; (c) placing the wreath on the vertical support arms so that the wreath attachment arms of the vertical support arms contact the wreath at points substantially corresponding to points of the top of the wreath most widely separated from each other; and (d) inserting the wreath stabilizing arm into the bottom of the wreath, to further stabilize the wreath as it is supported by the vertical support arms.

The present invention further provides a method of displaying a decorative wreath in conjunction with the alternate embodiment of the stand, comprising the steps of: (a) placing the base of the alternate embodiment of the display stand on a horizontal flat surface such that each of the support extensions of the vertical support arms of the stand extends vertically upward from the base and the wreath stabilizing arm and the second wreath stabilizing arm of the stand extend horizontally in a direction toward the front edge of the frame; (b) holding the wreath in a vertical alignment relative to the flat surface, the wreath being positioned such that the center of the wreath is substantially aligned with center points of the base and the frame; (c) placing the wreath on the wreath attachment arms of the vertical support arms such that the vertical support arms contact the wreath at points substantially corresponding to points on the top of the wreath most widely separated from each other; and (d) inserting the wreath stabilizing arm and the second wreath stabilizing arm into the bottom of the wreath, to further stabilize the wreath as it is supported by the vertical support arms.

DETAILED DESCRIPTION OF THE INVENTION

Figure 1:
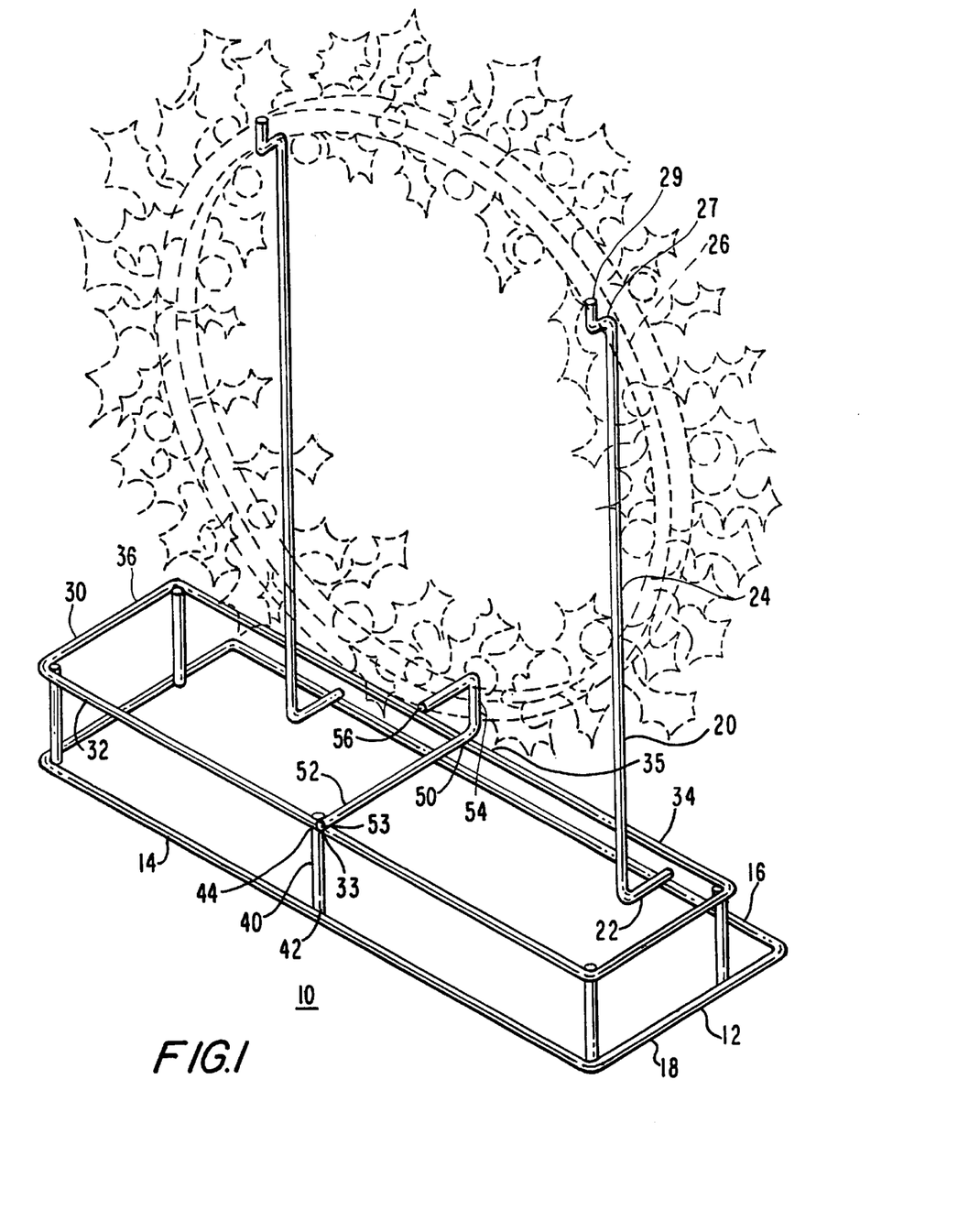
FIG. 1 shows a top, front, and right side view of the wreath display stand of the present invention, with a portion shown in dotted lines for environmental purposes only.
Figure 2:
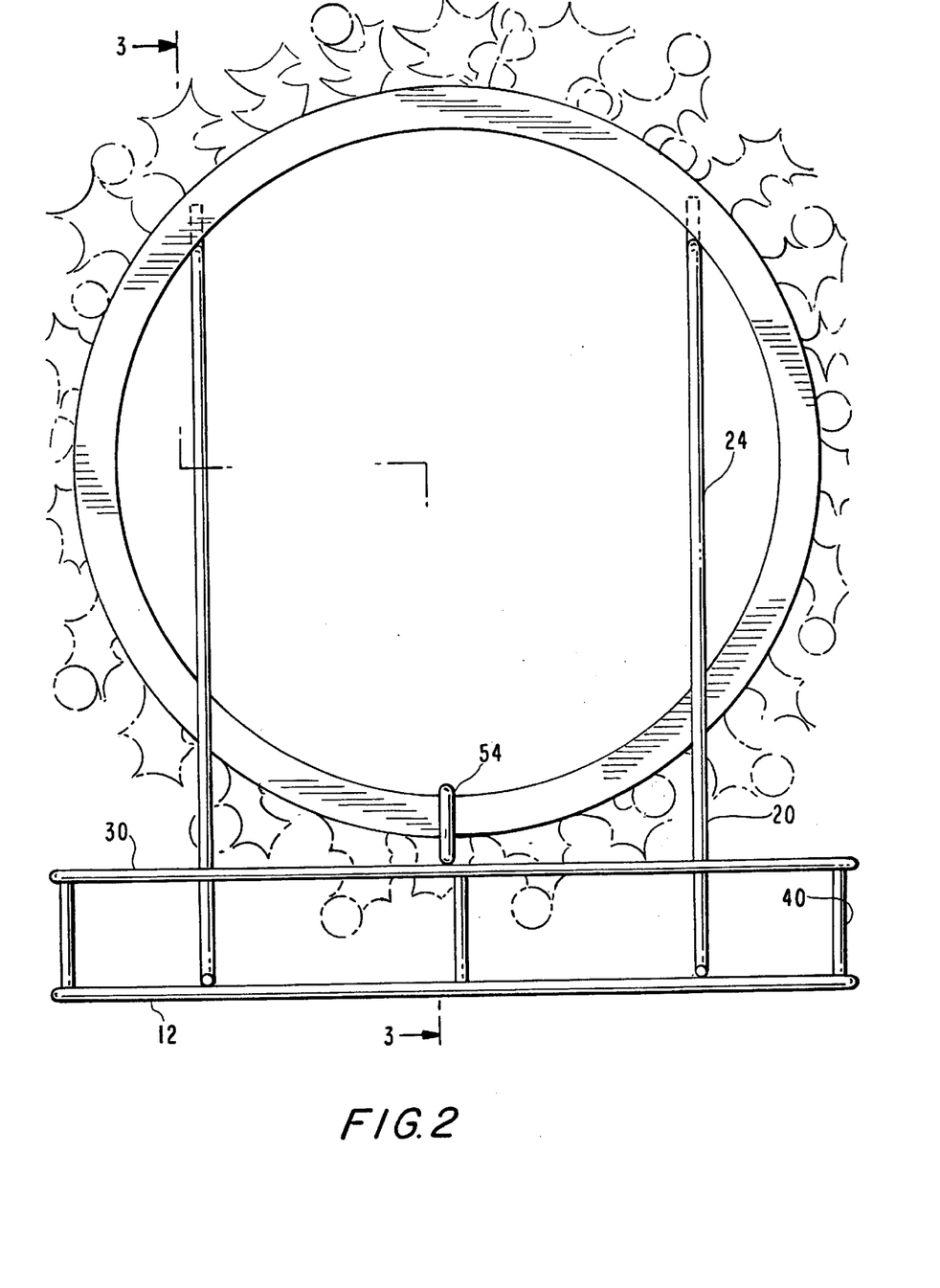
FIG. 2 shows a rear view of the wreath display stand of the present invention.
Figure 3:
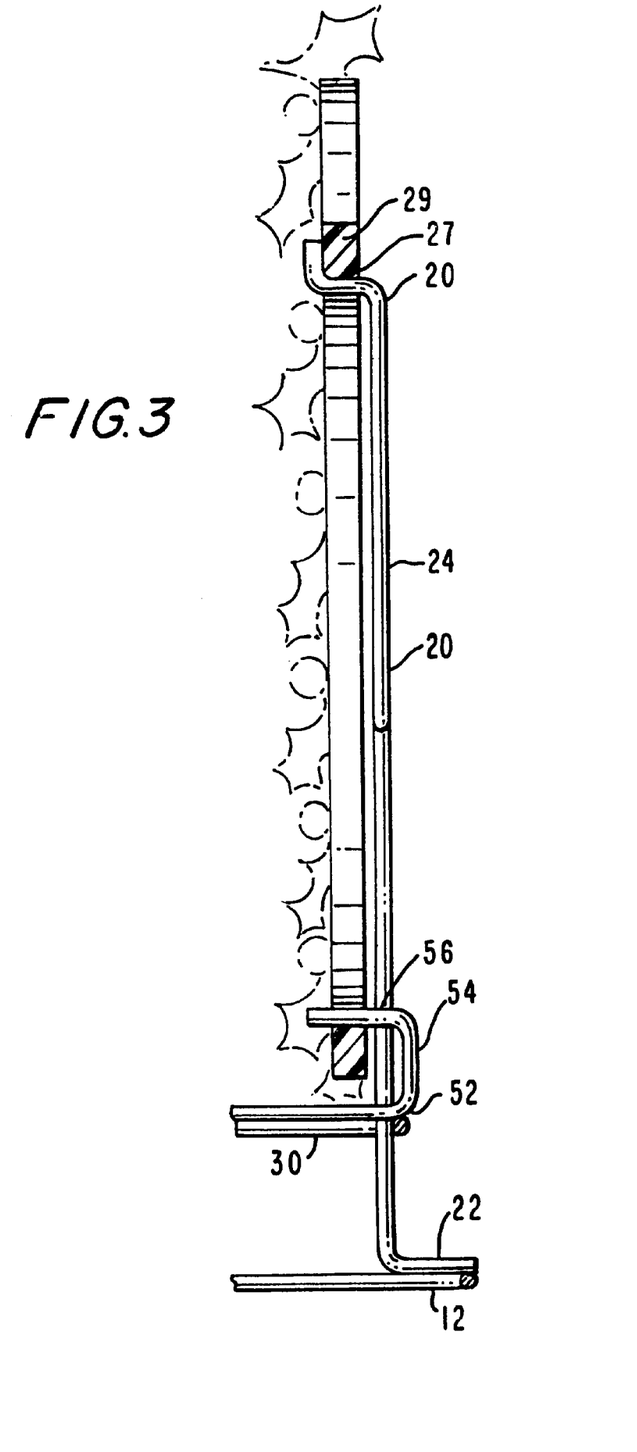
FIG. 3 shows a section view of the wreath display stand of the present invention along line 3—3 of FIG. 2.

Turning to FIGS. 1–3, the wreath display stand 10 of the present invention comprises: (a) a substantially rectangular base 12 having a width, a depth, front and back edges 14, 16, and two lateral edges 18; (b) two substantially vertical wreath support arms 20; (c) a substantially rectangular stabilizing frame 30 arrayed above the base 12 by a distance sufficient to stabilize the stand 10 when the wreath is displayed in a substantially vertical display alignment in conjunction therewith, the frame 30 also having a width, a depth, front and back edges 32, 34, and two lateral edges 36; (d) a plurality of stabilizing rods 40 extending between the base 12 and the frame 30 and connecting the frame 30 with the base 12; and (e) a wreath stabilizing brace 50 attached to the frame 30 at a central point 35 on the back edge 34 thereof, the brace 50 comprising (i) a brace attachment bar 52 having an end 53, the end 53 being securely attached to a central point 33 of the front edge 32 of the frame 30 and extending therefrom in a substantially horizontal plane to a central point 35 of the back edge 34 thereof, (ii) a brace attachment arm 54 that is continuous with the brace attachment bar 52 and is perpendicular to the frame 30 and the base 12, and (iii) a wreath stabilizing arm 56 attached to the brace attachment arm 54 and extending therefrom in a substantially horizontal plane arrayed above and parallel to a plane of the frame 30 by a distance sufficient to stabilize the bottom of the wreath in the substantially vertical display alignment, the wreath stabilizing arm 56 further extending away from the back edge 34 of the frame 30 and toward the front edge 32 thereof.

The base 12 is configured to sit on a horizontal flat surface, such as a tabletop, counter, desk, or other similar surface. The four edges 14, 16, 18 of the base 12 lie in a common horizontal plane. The width of the base 12 is sufficient to support the wreath in the substantially vertical alignment when the wreath is displayed in conjunction with the stand 10.

As further shown in FIG. 3, each wreath support arm 20 further comprises a support attachment arm 22, a support extension 24 and wreath attachment arm 26. Each of the support arms 20 is configured to support one lateral side of the wreath in the substantially vertical display alignment. Each of the support attachment arms 22 is securely attached to a point on the back edge 16 of the base 12 and extends therefrom in a substantially horizontal manner toward the front edge of the base 12 for a distance sufficient such that the support extensions 24 contact and are securely attached to the back edge 34 of the frame 30. Each of the support extensions 24 is continuous with its support attachment arm and extends vertically therefrom in an upward direction. Each of the support extensions 24 is perpendicular to the substantially horizontal plane of the base 12. Each of the wreath attachment arms 26 is continuous with its support extension 24 at an end thereof that is opposite the end of the support extension 24 that is continuous with the support attachment arm 22. Each wreath attachment arm 26 further comprises a horizontal resting portion 27 extending from the support extension 24 in the direction of the front edges of the base 12 and frame 30, respectively, and a vertical bracing portion 29 perpendicular to and extending upwardly from the resting portion 27. The length of each resting portion 27 is sufficient to support a lateral portion of the wreath resting thereon. The length of each bracing portion 29 is substantially identical to the length of its resting portion 27.

As shown in FIG. 1, the four edges 32, 34, 36 of the frame 30 also lie in a common horizontal plane. The width of the frame 30 is substantially identical to the width of the base 12. However, the depth of the frame 30 is less than that of the base 12. As a result, while the front edge 32 of the frame 30 is in a common vertical plane with the front edge 14 of the base 12, and the lateral edges 36 of the frame 30 are in further common vertical planes with the lateral edges 18 of the base 12, the back edge 34 of the frame 30 and the back edge 16 of the base 12 are not in a further common vertical plane. The horizontal plane of the frame 30 is substantially parallel to the horizontal plane of the base 12.

Each of the stabilizing rods 40 has a length and two ends 42, 44. One end 42 of each stabilizing rod 40 is securely attached to an edge of the base 12, the other end 44 being securely attached to a corresponding edge of the stabilizing frame 30. The length of each stabilizing rod 40 is substantially equal to the distance that the frame 30 is arrayed above the base 12. The stabilizing rods 40, together with the frame 30, further stabilize the stand 10 when a wreath is displayed in the vertical display alignment in conjunction therewith.

Figure 5:
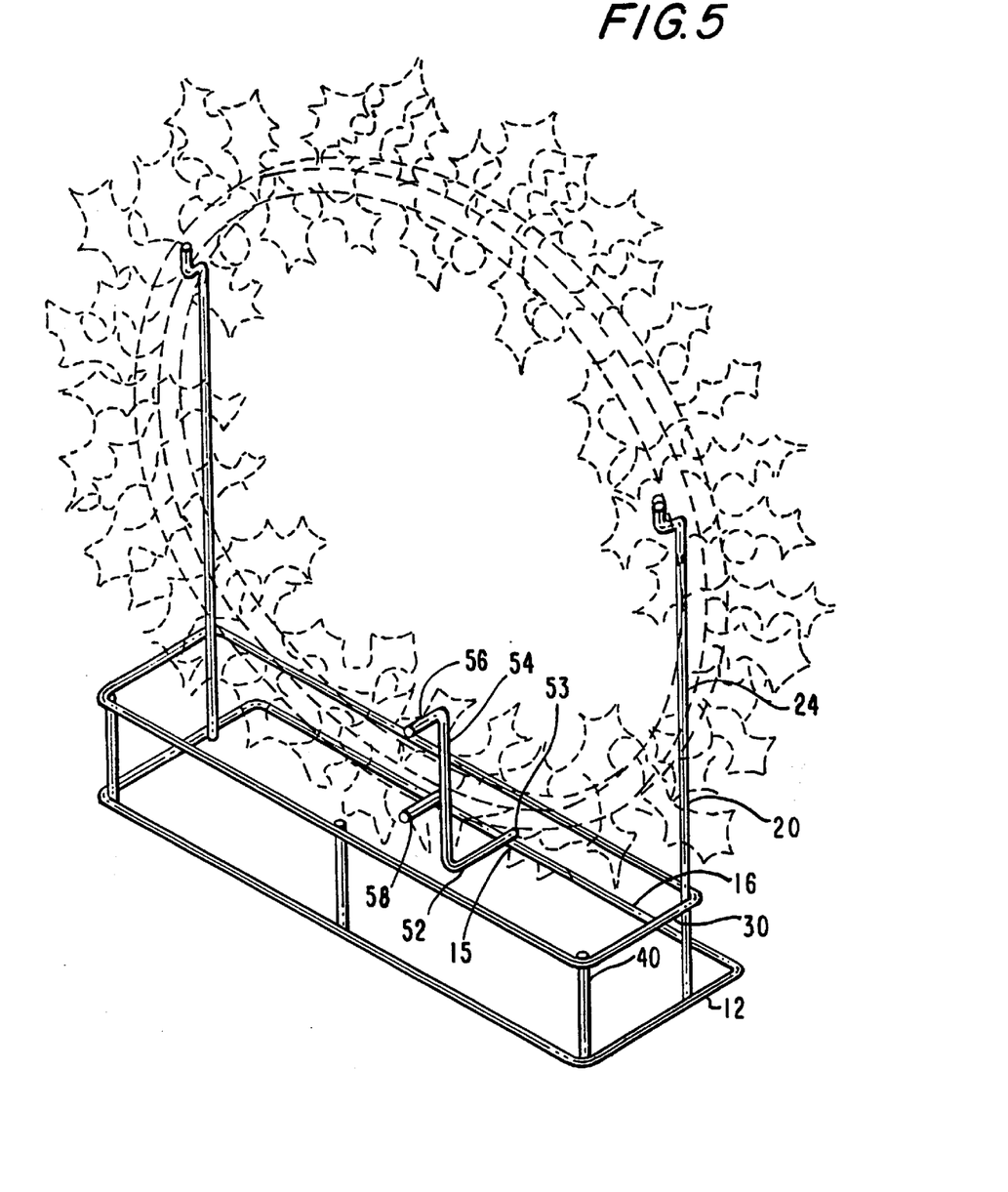
FIG. 5 shows a top, front, and right side view of a further alternate embodiment of the wreath display stand of the present invention, with a portion shown in dotted lines for environmental purposes only.

Turning to FIG. 5, in an alternate embodiment of the stand 10 of the present invention, the wreath support arms 20 do not include a support attachment arm 22. Rather an end of the support extension 24 of each wreath support arm 20 is securely attached to a point on either of the lateral edges 18 of the base 12 and extends vertically therefrom in an upward direction, the point of attachment being such that the support extensions 24 of the wreath support arms 20 also contact and are securely attached to the back edge 34 of the frame 30. Further in this embodiment, the end 53 of the brace attachment bar 52 of the wreath stabilizing brace 50 is attached to a central point 15 on the back edge 16 of the base 12, extending therefrom in a substantially horizontal plane in the direction of the front edge 14 of the base 12. The wreath stabilizing brace 50 further includes a second wreath stabilizing arm 58 attached to the brace attachment arm 54 and extending therefrom in a substantially horizontal plane arrayed between and parallel to the horizontal planes of the frame 30 and base 12, by a distance sufficient to further stabilize the bottom of the wreath in the vertical display alignment, the second wreath stabilizing arm 58 further extending in a direction away from the back edge 34 of the frame 30 and toward the front edge 32 thereof.

Figure 4:
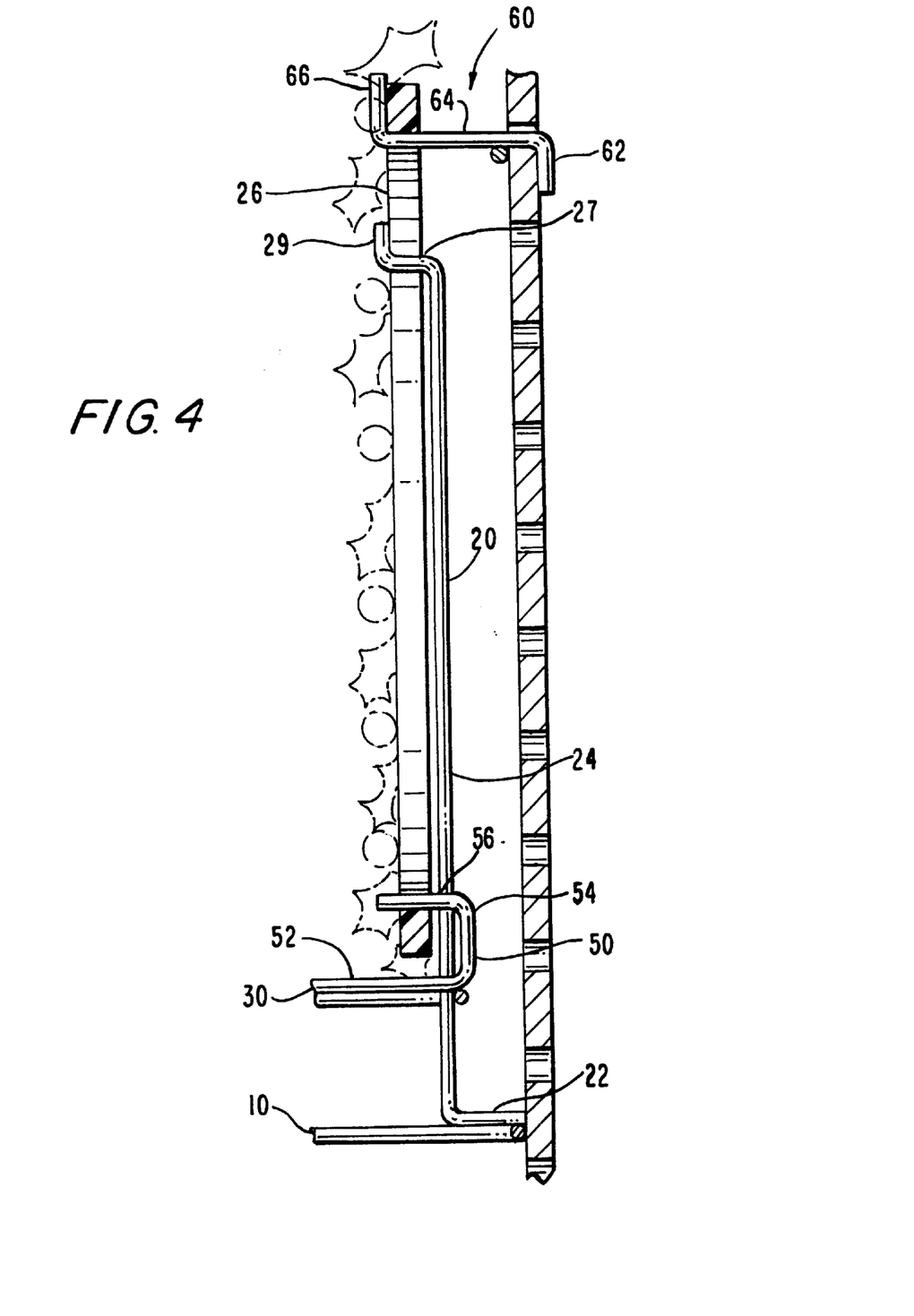
FIG. 4 is a right side view of an alternate embodiment of the wreath display stand of the present invention, showing the display stand with an attached wreath mounted on a pegboard.

Turning to FIG. 4, a further alternate embodiment of the stand 10 of the present invention includes a cantilever wreath support 60 permitting the wreath in conjunction with the stand 10 to be displayed in the vertical display alignment on a pegboard. The cantilever wreath support 60 further comprises a peg board bracing element 62 attached to die peg board, a wreath support element 64 that is continuous with the peg board bracing element 62 and is perpendicular thereto, and a wreath bracing element 66 that is continuous with the wreath support element 64 at an end furthest from the peg board bracing element 62, and is perpendicular to the wreath support element 64. The wreath support element 64 is configured such that, when the peg board bracing element 62 is attached to the peg board, the wreath support element 64 extends in a substantially horizontal manner in a direction away from the peg board. The wreath bracing element 66 is configured such that, when the peg board bracing element 62 is attached to the peg board, the wreath bracing element 66 extends vertically from the wreath support element 64 in an upward direction. The wreath support element 64 has a length sufficient to permit a wreath in its vertical display alignment in conjunction with the stand 10 to be hung on the cantilever wreath support while maintaining the vertical display alignment. The length of the wreath bracing element 66 is sufficient to prevent the wreath from falling off the wreath support element 64 of the cantilever wreath support 60 when the wreath in conjunction with the stand 10 is hung thereon in the vertical display alignment.

The stand 10 may be made out of any conventional material that is sufficiently rigid to support the weight of the wreath when displayed in the vertical display alignment in conjunction therewith, and also is sufficiently light to be portable when used in conjunction with a wreath. In a preferred embodiment, the stand 10 is made from 3-mm thick metal wire. The various parts of the stand may be attached to each other by conventional means sufficient to provide an integrated stand able to support a wreath in the vertical display alignment. In a preferred embodiment, the parts of the stand are attached to each other by spot welding.

According to the method of the present invention, the wreath is displayed in conjunction with the stand 10 by placing the base 12 on a table top or other horizontal flat surface. As placed, the vertical support extensions 24 of the support arms 20 extend vertically upward from either their respective support attachment arms 22 and the wreath stabilizing arm 56 extends horizontally in the direction of the front edge 32 of the frame 30. The wreath to be displayed is held in a vertical alignment and positioned such that the center of the wreath, when viewed from the front, is substantially aligned with the center points 33, 35 of the frame 30. So positioned, the wreath is placed on the resting portions 27 of the wreath attachment arms 26 of the vertical support arms 20 such that the resting portions 27 and bracing portions 29 of the wreath attachment arms 26 are contacting the wreath at points substantially corresponding to points of the top of the wreath most widely separated from each other, meaning, those two points on a wreath the greatest distance from each other by which the wreath may be displayed in its vertical, most decoratively advantageous alignment, when the wreath is so displayed by placing it on a support extending horizontally through the open center of the wreath. The wreath stabilizing arm 56 is then inserted into the bottom of the wreath, thereby further stabilizing the wreath as it is supported by the vertical support arms 20.

According to an alternate method, the wreath is displayed in conjunction with the stand of the alternate embodiment of FIG. 5, by placing the base 12 of the alternate embodiment of the display stand 10 on a horizontal flat surface such that each of the support extensions 24 of the vertical support arms 20 extends vertically upward from the base 12 and the wreath stabilizing arm 56 and the second wreath stabilizing arm 58 extend horizontally in a direction toward the front edge 32 of the frame 30. The wreath is held in a vertical alignment relative to the flat surface, the wreath being positioned such that the center of the wreath is substantially aligned with center points of the base 12 and the frame 30. The wreath is placed on the wreath attachment arms 26 of the vertical support arms 20 such that the vertical support arms 20 contact the wreath at points substantially corresponding to points on the top of the wreath most widely separated from each other. The wreath stabilizing arm 56 and the second wreath stabilizing arm 58 are inserted into the bottom of the wreath, to further stabilize the wreath as it is supported by the vertical support arms 20.

The vertical display alignment of the wreath when used in conjunction with the stand 10 allows both the front and back sides of the wreath to be viewed, thus permitting the full decorative potential of the wreath to be exploited. By supporting the wreath laterally at its top edge with the wreath support arms 20, rather than via the bottom of the wreath, an irregularly shaped wreath, such as a valentine, may be maintained in the most decoratively advantageous alignment without further manipulation. Subsequently stabilizing the wreath via the wreath stabilizing arm 56 helps maintain the vertical display alignment of the wreath.

While the invention has been described with respect to certain specific embodiments, it will be appreciated that many modifications and changes may be made by those skilled in the art without departing from the invention. It is intended, therefore, by the appended claims to cover all such modifications and changes as may fall within the true spirit and scope of the invention.

What is claimed is:

1. A stand for displaying a decorative wreath, comprising:
 a substantially rectangular base having a first width, a first depth, front and back edges, and two lateral edges, the base being configured to sit on a horizontal flat surface, the front and back edges and the lateral edges being arrayed in a first common horizontal plane, the first width being sufficient to support the wreath in a substantially vertical display alignment when the wreath is displayed in conjunction with the stand;
 two substantially vertical wreath support arms, each wreath support arm further comprising a support attachment arm securably attached to a point on the back edge of the base and extending therefrom in a substantially horizontal manner toward the front edge of the base, a support extension that is continuous with the support attachment arm and extends vertically therefrom in an upward direction, and a wreath attachment arm that is continuous with the support extension at and end thereof that is opposite an end of the support extension that is continuous with the support attachment arm, each of the wreath support arms being configured to support one lateral side of the wreath in the substantially vertical display alignment;
 a substantially rectangular stabilizing frame arrayed above the base by a distance sufficient to stabilize the stand when the wreath is displayed in the substantially vertical display alignment in conjunction therewith, the frame having a second width, a second depth, front and back edges, and two lateral edges, the front and back edges and the lateral edges of the frame being arrayed in a second common horizontal plane, the second width of the frame being substantially identical to the first width of the base, the second depth of the frame being less than the first depth of the base, the front edge of the frame being in a common vertical plane with the front edge of the base, the lateral edges of the frame being in further common vertical planes with the lateral edges of the base, the second common horizontal plane being substantially parallel to the first common horizontal plane, the frame being securably attached to each of the vertical support arms at a point on the back edge of the frame;
 a plurality of stabilizing rods extending between the base and the stabilizing frame and connecting the frame to the base, each of the stabilizing rods having a length and two ends, one end of each stabilizing rod being securably attached to a corresponding edge of the base, an other end of each stabilizing rod being securably attached to an edge of the stabilizing frame, the length of each stabilizing rod being substantially equal to the distance that the stabilizing frame is arrayed above the base, the rods further stabilizing the stand when the wreath is displayed in conjunction therewith; and
 a wreath stabilizing brace securably attached to the stabilizing frame at a central point on the back edge thereof, the brace comprising a brace attachment bar having an end securably attached to a central point of the front edge of the frame and extending therefrom in a substantially horizontal plane to a central point of the back edge thereof, a brace attachment arm that is continuous with the brace attachment bar and is perpendicular to the frame and the base, and a wreath stabilizing arm attached to the brace attachment arm and extending therefrom in a substantially horizontal plane arrayed above and parallel to a plane of the frame by a distance sufficient to stabilize the bottom of the wreath in the substantially vertical display alignment, and further extending away from the back edge of the frame and toward the front edge thereof.

2. The stand of claim 1, wherein each of the support attachment arms is securably attached to a point on the back edge of the base and extends therefrom in a substantially horizontal manner toward the front edge of the base for a distance sufficient such that the support extensions contact and are securably attached to the back edge of the frame.

3. A stand for displaying a decorative wreath, comprising:

a substantially rectangular base having a first width, a first depth, front and back edges, and two lateral edges, the base being configured to sit on a horizontal flat surface, the front and back edges and the lateral edges being arrayed in a first common horizontal plane, the first width being sufficient to support the wreath in a substantially vertical display alignment when the wreath is displayed in conjunction with the stand;

two substantially vertical wreath support arms, each wreath support arm further comprising a support extension that is securably attached to a point on a lateral edge of the base and extends vertically therefrom in an upward direction, and a wreath attachment arm that is continuous with the support extension at and end thereof that is opposite an end of the support extension that is securably attached to a lateral edge of the base, each of the wreath support arms being configured to support one lateral side of the wreath in the substantially vertical display alignment;

a substantially rectangular stabilizing frame arrayed above the base by a distance sufficient to stabilize the stand when the wreath is displayed in the substantially vertical display alignment in conjunction therewith, the frame having a second width, a second depth, front and back edges, and two lateral edges, the front and back edges and the lateral edges of the frame being arrayed in a second common horizontal plane, the second width of the frame being substantially identical to the first width of the base, the second depth of the frame being less than the first depth of the base, the front edge of the frame being in a common vertical plane with the front edge of the base, the lateral edges of the frame being in further common vertical planes with the lateral edges of the base, the second common horizontal plane being substantially parallel to the first common horizontal plane;

a plurality of stabilizing rods extending between the base and the stabilizing frame and connecting the frame to the base, each of the stabilizing rods having a length and two ends, one end of each stabilizing rod being securably attached to a corresponding edge of the base, an other end of each stabilizing rod being securably attached to an edge of the stabilizing frame, the length of each stabilizing rod being substantially equal to the distance that the stabilizing frame is arrayed above the base, the rods further stabilizing the stand when the wreath is displayed in conjunction therewith; and a wreath stabilizing brace securably attached to the stabilizing frame at a central point on the back edge thereof, the brace comprising a brace attachment bar having an end securably attached to a central point of the back edge of the base and extending therefrom in a substantially horizontal plane in a direction toward the front edge thereof, a brace attachment arm that is continuous with the brace attachment bar and is perpendicular to the frame and the base; a wreath stabilizing arm attached to the brace attachment arm and extending therefrom in a substantially horizontal plane arrayed above and parallel to a plane of the frame by a distance sufficient to stabilize the bottom of the wreath in the substantially vertical display alignment, the wreath stabilizing arm further extending away from the back edge of the frame and toward the front edge thereof; and a second wreath stabilizing arm attached to the brace attachment arm and extending therefrom in a substantially horizontal plane arrayed between and parallel to the horizontal planes of the frame and the base by a distance sufficient to further stabilize the bottom of the wreath in the vertical display alignment, the second wreath stabilizing arm further extending in a direction away from the back edge of the frame and toward the front edge thereof.

4. The stand of claim 3, wherein each of the support extensions is securably attached to a lateral edge of the base at a point such that the support extensions also contact and are securably attached to the back edge of the frame.

5. The stand of claim 1 or claim 3, wherein each of the wreath attachment arms includes a horizontal resting portion extending from the support extension in a direction toward the front edges of the base and the frame, and a vertical bracing portion perpendicular to and extending upwardly from the resting portion.

6. A stand for displaying a decorative wreath, comprising:

a substantially rectangular base having a first width, a first depth, front and back edges, and two lateral edges, the base being configured to sit on a horizontal flat surface, the front and back edges and the lateral edges being arrayed in a first common horizontal plane, the first width being sufficient to support the wreath in a substantially vertical display alignment when the wreath is displayed in conjunction with the stand;

two substantially vertical wreath support arms, each wreath support arm further comprising a support attachment arm securably attached to a point on the back edge of the base and extending therefrom in a substantially horizontal manner toward the front edge of the base, a support extension that is continuous with the support attachment arm and extends vertically therefrom in an upward direction, and a wreath attachment arm that is continuous with the support extension at and end thereof that is opposite an end of the support extension that is continuous with the support attachment arm, each of the wreath support arms being configured to support one lateral side of the wreath in the substantially vertical display alignment;

a substantially rectangular stabilizing frame arrayed above the base by a distance sufficient to stabilize the stand when the wreath is displayed in the substantially vertical display alignment in conjunction therewith, the frame having a second width, a second depth, front and back edges, and two lateral edges, the front and back edges and the lateral edges of the frame being arrayed in a second common horizontal plane, the second width of the frame being substantially identical to the first width of the base, the second depth of the frame being less than the first depth of the base, the front edge of the frame being in a common vertical plane with the front edge of the base, the lateral edges of the frame being in further common vertical planes with the lateral edges of the base, the second common horizontal plane being substantially parallel to the first common horizontal plane, the frame being securably attached to each of the vertical support arms at a point on the back edge of the frame;

a plurality of stabilizing rods extending between the base and the stabilizing frame and connecting the frame to the base, each of the stabilizing rods having a length and two ends, one end of each stabilizing rod being securably attached to a corresponding edge of the base, an other end of each stabilizing rod being securably attached to an edge of the stabilizing frame, the length of each stabilizing rod being substantially equal to the distance that the stabilizing frame is arrayed above the base, the rods further stabilizing the stand when the wreath is displayed in conjunction therewith; and a wreath stabilizing brace securably attached to the stabilizing frame at a central point on the back edge thereof, the brace comprising a brace attachment bar having an end securably attached to a central point of the front edge of the frame and extending therefrom in a substantially horizontal plane to a central point of the back edge thereof, a brace attachment arm that is continuous with the brace attachment bar and is perpendicular to the frame and the base, and a wreath stabilizing arm attached to the brace attachment arm and extending therefrom in a substantially horizontal plane arrayed above and parallel to a plane of the frame by a distance sufficient to stabilize the bottom of the wreath in the substantially vertical display alignment, and further extending away from the back edge of the frame and toward the front edge thereof;

further comprising a cantilever wreath support permitting the wreath in conjunction with the stand to be displayed in the vertical display alignment on a pegboard, the cantilever wreath support further comprising:

a peg board bracing element attached to the peg board;

a wreath support element that is continuous with the peg board bracing element and is perpendicular thereto; and a wreath bracing element that is continuous with the wreath support element at an end furthest from the peg board bracing element, and is perpendicular to the wreath support element, wherein, the wreath support element is configured such that, when the peg board bracing element is attached to the peg board, the wreath support element extends in a substantially horizontal manner in a direction away from the peg board, and the wreath bracing element extends vertically in an upward direction;

the wreath support element has a length sufficient to permit a wreath in its vertical display alignment in conjunction with the stand to be hung on the cantilever wreath support while maintaining the vertical display alignment; and the wreath bracing element has a length sufficient to prevent the wreath from falling off the wreath support element of the cantilever wreath support when the wreath in conjunction with the stand is hung thereon in the vertical display alignment;

wherein each of the support attachment arms is securably attached to a point on the back edge of the base and extends therefrom in a substantially horizontal manner toward the front edge of the base for a distance sufficient such that the support extensions contact and are securably attached to the back edge of the frame, and wherein each of the wreath attachment arms includes a horizontal resting portion extending from the support extension in a direction toward the front edges of the base and the frame, and a vertical bracing portion perpendicular to and extending upwardly from the resting portion.

7. A method of displaying a decorative wreath, the wreath having a center, two lateral sides, a top and a bottom, comprising the steps of:

(a) placing the base of a stand for displaying a decorative wreath, comprising:

a substantially rectangular base having a first width, a first depth, front and back edges, and two lateral edges, the base being configured to sit on a horizontal flat surface, the front and back edges and the lateral edges being arrayed in a first common horizontal plane, the first width being sufficient to support the wreath in a substantially vertical display alignment when the wreath is displayed in conjunction with the stand;

two substantially vertical wreath support arms, each wreath support arm further comprising a support attachment arm securably attached to a point on the back edge of the base and extending therefrom in a substantially horizontal manner toward the front edge of the base, a support extension that is continuous with the support attachment arm and extends vertically therefrom in an upward direction, and a wreath attachment arm that is continuous with the support extension at and end thereof that is opposite an end of the support extension that is continuous with the support attachment arm, each of the wreath support arms being configured to support one lateral side of the wreath in the substantially vertical display alignment;

a substantially rectangular stabilizing frame arrayed above the base by a distance sufficient to stabilize the stand when the wreath is displayed in the substantially vertical display alignment in conjunction therewith, the frame having a second width, a second depth, front and back edges, and two lateral edges, the front and back edges and the lateral edges of the frame being arrayed in a second common horizontal plane, the second width of the frame being substantially identical to the first width of the base, the second depth of the frame being less than the first depth of the base, the front edge of the frame being in a common vertical plane with the front edge of the base, the lateral edges of the frame being in further common vertical planes with the lateral edges of the base, the second common horizontal plane being substantially parallel to the first common horizontal plane, the frame being securably attached to each of the vertical support arms at a point on the back edge of the frame;

a plurality of stabilizing rods extending between the base and the stabilizing frame and connecting the frame to the base, each of the stabilizing rods having a length and two ends, one end of each stabilizing rod being securably attached to a corresponding edge of the base, an other end of each stabilizing rod being securably attached to an edge of the stabilizing frame, the length of each stabilizing rod being substantially equal to the distance that the stabilizing frame is arrayed above the base, the rods further stabilizing the stand when the wreath is displayed in conjunction therewith; and a wreath stabilizing brace securably attached to the stabilizing frame at a central point on the back edge thereof, the brace comprising a brace attachment bar having an end securably attached to a central point of the front edge of the frame and extending therefrom in a substantially horizontal plane to a central point of the back edge thereof, a brace attachment arm that is continuous with the brace attachment bar and is perpendicular to the frame and the base, and a wreath stabilizing arm attached to the brace attachment arm and extending therefrom in a substantially horizontal plane arrayed above and parallel to a plane of the frame by a distance sufficient to stabilize the bottom of the wreath in the substantially vertical display alignment, and further extending away from the back edge of the frame and toward the front edge thereof on a horizontal flat surface such that each of the support extensions of the vertical support arms of the stand extends vertically upward from its support attachment arm and the wreath stabilizing arm of the stand extends horizontally in a direction toward the front edge of the frame;

(b) holding the wreath in a vertical alignment relative to the flat surface, the wreath being positioned such that the center of the wreath is substantially aligned with center points of the base and the frame;

(c) placing the wreath on the wreath attachment arms of the vertical support arms such that the vertical support arms contact the wreath at points substantially corresponding to points on the top of the wreath most widely separated from each other; and (d) inserting the wreath stabilizing arm into the bottom of the wreath, to further stabilize the wreath as it is supported by the vertical support arms.

8. A method of displaying a decorative wreath, the wreath having a center, two lateral sides, a top and a bottom, comprising the steps of:

(a) placing the base of a stand for displaying a decorative wreath, comprising:

a substantially rectangular base having a first width, a first depth, front and back edges, and two lateral edges, the base being configured to sit on a horizontal flat surface, the front and back edges and the lateral edges being arrayed in a first common horizontal plane, the first width being sufficient to support the wreath in a substantially vertical display alignment when the wreath is displayed in conjunction with the stand;

two substantially vertical wreath support arms, each wreath support arm further comprising a support extension that is securably attached to a point on a lateral edge of the base and extends vertically therefrom in an upward direction, and a wreath attachment arm that is continuous with the support extension at and end thereof that is opposite an end of the support extension that is securably attached to a lateral edge of the base, each of the wreath support arms being configured to support one lateral side of the wreath in the substantially vertical display alignment;

a substantially rectangular stabilizing frame arrayed above the base by a distance sufficient to stabilize the stand when the wreath is displayed in the substantially vertical display alignment in conjunction therewith, the frame having a second width, a second depth, front and back edges, and two lateral edges, the front and back edges and the lateral edges of the frame being arrayed in a second common horizontal plane, the second width of the frame being substantially identical to the first width of the base, the second depth of the frame being less than the first depth of the base, the front edge of the frame being in a common vertical plane with the front edge of the base, the lateral edges of the frame being in further common vertical planes with the lateral edges of the base, the second common horizontal plane being substantially parallel to the first common horizontal plane;

a plurality of stabilizing rods extending between the base and the stabilizing frame and connecting the frame to the base, each of the stabilizing rods having a length and two ends, one end of each stabilizing rod being securably attached to a corresponding edge of the base, an other end of each stabilizing rod being securably attached to an edge of the stabilizing frame, the length of each stabilizing rod being substantially equal to the distance that the stabilizing frame is arrayed above the base, the rods further stabilizing the stand when the wreath is displayed in conjunction therewith; and a wreath stabilizing brace securably attached to the stabilizing frame at a central point on the back edge thereof, the brace comprising a brace attachment bar having an end securably attached to a central point of the back edge of the base and extending therefrom in a substantially horizontal plane in a direction toward the front edge thereof, a brace attachment arm that is continuous with the brace attachment bar and is perpendicular to the frame and the base; a wreath stabilizing arm attached to the brace attachment arm and extending therefrom in a substantially horizontal plane arrayed above and parallel to a plane of the frame by a distance sufficient to stabilize the bottom of the wreath in the substantially vertical display alignment, the wreath stabilizing arm further extending away from the back edge of the frame and toward the front edge thereof; and a second wreath stabilizing arm attached to the brace attachment arm and extending therefrom in a substantially horizontal plane arrayed between and parallel to the horizontal planes of the frame and the base by a distance sufficient to further stabilize the bottom of the wreath in the vertical display alignment, the second wreath stabilizing arm further extending in a direction away from the back edge of the frame and toward the front edge thereof; on a horizontal flat surface such that each of the support extensions of the vertical support arms of the stand extends vertically upward from the base and the wreath stabilizing arm and the second wreath stabilizing arm of the stand extend horizontally in a direction toward the front edge of the frame;

(b) holding the wreath in a vertical alignment relative to the flat surface, the wreath being positioned such that the center of the wreath is substantially aligned with center points of the base and the frame;

(c) placing the wreath on the wreath attachment arms of the vertical support arms such that the vertical support arms contact the wreath at points substantially corresponding to points on the top of the wreath most widely separated from each other; and (d) inserting the wreath stabilizing arm and the second wreath stabilizing arm into the bottom of the wreath, to further stabilize the wreath as it is supported by the vertical support arms.

9. A stand for displaying a decorative wreath, comprising:

a substantially rectangular base having a first width, a first depth, front and back edges, and two lateral edges, the base being configured to sit on a horizontal flat surface, the front and back edges and the lateral edges being arrayed in a first common horizontal plane, the first width being sufficient to support the wreath in a substantially vertical display alignment when the wreath is displayed in conjunction with the stand;

two substantially vertical wreath support arms, each wreath support arm further comprising a support attachment arm securably attached to a point on the back edge of the base and extending therefrom in a substantially horizontal manner toward the front edge of the base, a support extension that is continuous with the support attachment arm and extends vertically therefrom in an upward direction, and a wreath attachment arm that is continuous with the support extension at and end thereof that is opposite an end of the support extension that is continuous with the support attachment arm, each of the wreath support arms being configured to support one lateral side of the wreath in the substantially vertical display alignment;

a substantially rectangular stabilizing frame arrayed above the base by a distance sufficient to stabilize the stand when the wreath is displayed in the substantially vertical display alignment in conjunction therewith, the frame having a second width, a second depth, front and back edges, and two lateral edges, the front and back edges and the lateral edges of the frame being arrayed in a second common horizontal plane, the second width of the frame being substantially identical to the first width of the base, the second depth of the frame being less than the first depth of the base, the front edge of the frame being in a common vertical plane with the front edge of the base, the lateral edges of the frame being in further common vertical planes with the lateral edges of the base, the second common horizontal plane being substantially parallel to the first common horizontal plane, the frame being securably attached to each of the vertical support arms at a point on the back edge of the frame;

a plurality of stabilizing rods extending between the base and the stabilizing frame and connecting the frame to the base, each of the stabilizing rods having a length and two ends, one end of each stabilizing rod being securably attached to a corresponding edge of the base, an other end of each stabilizing rod being securably attached to an edge of the stabilizing frame, the length of each stabilizing rod being substantially equal to the distance that the stabilizing frame is arrayed above the base, the rods further stabilizing the stand when the wreath is displayed in conjunction therewith; and a wreath stabilizing brace securably attached to the stabilizing frame at a central point on the back edge thereof, the brace comprising a brace attachment bar having an end securably attached to a central point of the back edge of the frame and extending therefrom in a substantially horizontal plane in a direction toward the front edge thereof, a brace attachment arm that is continuous with the brace attachment bar and is perpendicular to the frame and the base, and at least one wreath stabilizing arm attached to the brace attachment arm and extending therefrom in at least one substantially horizontal plane arrayed above and parallel to a plane of the frame by a distance sufficient to stabilize the bottom of the wreath in the substantially vertical display alignment, and further extending away from the back edge of the frame and toward the front edge thereof.

10. A stand for displaying a decorative wreath, comprising:

a substantially rectangular base having a first width, a first depth, front and back edges, and two lateral edges, the base being configured to sit on a horizontal flat surface, the front and back edges and the lateral edges being arrayed in a first common horizontal plane, the first width being sufficient to support the wreath in a substantially vertical display alignment when the wreath is displayed in conjunction with the stand;

two substantially vertical wreath support arms, each wreath support arm further comprising a support attachment arm securably attached to a point on the back edge of the base and extending therefrom in a substantially horizontal manner toward the front edge of the base, a support extension that is continuous with the support attachment arm and extends vertically therefrom in an upward direction, and a wreath attachment arm that is continuous with the support extension at and end thereof that is opposite an end of the support extension that is continuous with the support attachment arm, each of the wreath support arms being configured to support one lateral side of the wreath in the substantially vertical display alignment;

a substantially rectangular stabilizing frame arrayed above the base by a distance sufficient to stabilize the stand when the wreath is displayed in the substantially vertical display alignment in conjunction therewith, the frame having a second width, a second depth, front and back edges, and two lateral edges, the front and back edges and the lateral edges of the frame being arrayed in a second common horizontal plane, the second width of the frame being substantially identical to the first width of the base, the second depth of the frame being less than the first depth of the base, the front edge of the frame being in a common vertical plane with the front edge of the base, the lateral edges of the frame being in further common vertical planes with the lateral edges of the base, the second common horizontal plane being substantially parallel to the first common horizontal plane, the frame being securably attached to each of the vertical support arms at a point on the back edge of the frame;

a plurality of stabilizing rods extending between the base and the stabilizing frame and connecting the frame to the base, each of the stabilizing rods having a length and two ends, one end of each stabilizing rod being securably attached to a corresponding edge of the base, an other end of each stabilizing rod being securably attached to an edge of the stabilizing frame, the length of each stabilizing rod being substantially equal to the distance that the stabilizing frame is arrayed above the base, the rods further stabilizing the stand when the wreath is displayed in conjunction therewith; and a wreath stabilizing brace securably attached to the stabilizing frame at a central point on the back edge thereof, the brace comprising a brace attachment bar having an end securably attached to a central point of the back edge of the frame and extending therefrom in a substantially horizontal plane in a direction toward the front edge thereof, a brace attachment arm that is continuous with the brace attachment bar and is perpendicular to the frame and the base, and at least one wreath stabilizing arm attached to the brace attachment arm and extending therefrom in at least one substantially horizontal plane arrayed above and parallel to a plane of the frame by a distance sufficient to stabilize the bottom of the wreath in the substantially vertical display alignment, and further extending away from the back edge of the frame and toward the front edge thereof; further comprising a cantilever wreath support permitting the wreath in conjunction with the stand to be displayed in the vertical display alignment on a pegboard, the cantilever wreath support further comprising:

a peg board bracing element attached to the peg board;

a wreath support element that is continuous with the peg board bracing element and is perpendicular thereto; and a wreath bracing element that is continuous with the wreath support element at an end furthest from the peg board bracing element, and is perpendicular to the wreath support element, wherein, the wreath support element is configured such that, when the peg board bracing element is attached to the peg board, the wreath support element extends in a substantially horizontal manner in a direction away from the peg board, and the wreath bracing element extends vertically in an upward direction;

the wreath support element has a length sufficient to permit a wreath in its vertical display alignment in conjunction with the stand to be hung on the cantilever wreath support while maintaining the vertical display alignment; and the wreath bracing element has a length sufficient to prevent the wreath from falling off the wreath support element of the cantilever wreath support when the wreath in conjunction with the stand is hung thereon in the vertical display alignment.

11. A method of displaying a decorative wreath, the wreath having a center, two lateral sides, a top and a bottom, comprising the steps of:

(a) placing the base of a stand for displaying a decorative wreath, comprising:

a substantially rectangular base having a first width, a first depth, front and back edges, and two lateral edges, the base being configured to sit on a horizontal flat surface, the front and back edges and the lateral edges being arrayed in a first common horizontal plane, the first width being sufficient to support the wreath in a substantially vertical display alignment when the wreath is displayed in conjunction with the stand;

two substantially vertical wreath support arms, each wreath support arm further comprising a support attachment arm securably attached to a point on the back edge of the base and extending therefrom in a substantially horizontal manner toward the front edge of the base, a support extension that is continuous with the support attachment arm and extends vertically therefrom in an upward direction, and a wreath attachment arm that is continuous with the support extension at and end thereof that is opposite an end of the support extension that is continuous with the support attachment arm, each of the wreath support arms being configured to support one lateral side of the wreath in the substantially vertical display alignment;

a substantially rectangular stabilizing frame arrayed above the base by a distance sufficient to stabilize the stand when the wreath is displayed in the substantially vertical display alignment in conjunction therewith, the frame having a second width, a second depth, front and back edges, and two lateral edges, the front and back edges and the lateral edges of the frame being arrayed in a second common horizontal plane, the second width of the frame being substantially identical to the first width of the base, the second depth of the frame being less than the first depth of the base, the front edge of the frame being in a common vertical plane with the front edge of the base, the lateral edges of the frame being in further common vertical planes with the lateral edges of the base, the second common horizontal plane being substantially parallel to the first common horizontal plane, the frame being securably attached to each of the vertical support arms at a point on the back edge of the frame;

a plurality of stabilizing rods extending between the base and the stabilizing frame and connecting the frame to the base, each of the stabilizing rods having a length and two ends, one end of each stabilizing rod being securably attached to a corresponding edge of the base, an other end of each stabilizing rod being securably attached to an edge of the stabilizing frame, the length of each stabilizing rod being substantially equal to the distance that the stabilizing frame is arrayed above the base, the rods further stabilizing the stand when the wreath is displayed in conjunction therewith; and a wreath stabilizing brace securably attached to the stabilizing frame at a central point on the back edge thereof, the brace comprising a brace attachment bar having an end securably attached to a central point of the back edge of the frame and extending therefrom in a substantially horizontal plane in a direction toward the front edge thereof, a brace attachment arm that is continuous with the brace attachment bar and is perpendicular to the frame and the base, and at least one wreath stabilizing arm attached to the brace attachment arm and extending therefrom in at least one substantially horizontal plane arrayed above and parallel to a plane of the frame by a distance sufficient to stabilize the bottom of the wreath in the substantially vertical display alignment, and further extending away from the back edge of the frame and toward the front edge thereof on a horizontal flat surface such that each of the support extensions of the vertical support arms of the stand extends vertically upward from its support attachment arm and the at least one wreath stabilizing arm of the stand extends horizontally in a direction toward the front edge of the frame;

(b) holding the wreath in a vertical alignment relative to the flat surface, the wreath being positioned such that the center of the wreath is substantially aligned with center points of the base and the frame;

(c) placing the wreath on the wreath attachment arms of the vertical support arms such that the vertical support arms contact the wreath at points substantially corresponding to points on the top of the wreath most widely separated from each other; and (d) inserting the at least one wreath stabilizing arm into the bottom of the wreath, to further stabilize the wreath as it is supported by the vertical support arms.

12. A stand for displaying a decorative wreath, comprising:

a substantially rectangular base having a first width, a first depth, front and back edges, and two lateral edges, the base being configured to sit on a horizontal flat surface, the front and back edges and the lateral edges being arrayed in a first common horizontal plane, the first width being sufficient to support the wreath in a substantially vertical display alignment when the wreath is displayed in conjunction with the stand;

two substantially vertical wreath support arms, each wreath support arm further comprising a support extension that is securably attached to a point on a lateral edge of the base and extends vertically therefrom in an upward direction, and a wreath attachment arm that is continuous with the support extension at and end thereof that is opposite an end of the support extension that is securably attached to a lateral edge of the base, each of the wreath support arms being configured to support one lateral side of the wreath in the substantially vertical display alignment;

a substantially rectangular stabilizing frame arrayed above the base by a distance sufficient to stabilize the stand when the wreath is displayed in the substantially vertical display alignment in conjunction therewith, the frame having a second width, a second depth, front and back edges, and two lateral edges, the front and back edges and the lateral edges of the frame being arrayed in a second common horizontal plane, the second width of the frame being substantially identical to the first width of the base, the second depth of the frame being less than the first depth of the base, the front edge of the frame being in a common vertical plane with the front edge of the base, the lateral edges of the frame being in further common vertical planes with the lateral edges of the base, the second common horizontal plane being substantially parallel to the first common horizontal plane;

a plurality of stabilizing rods extending between the base and the stabilizing frame and connecting the frame to the base, each of the stabilizing rods having a length and two ends, one end of each stabilizing rod being securably attached to a corresponding edge of the base, an other end of each stabilizing rod being securably attached to an edge of the stabilizing frame, the length of each stabilizing rod being substantially equal to the distance that the stabilizing frame is arrayed above the base, the rods further stabilizing the stand when the wreath is displayed in conjunction therewith;

a wreath stabilizing brace securably attached to the stabilizing frame at a central point on the back edge thereof, the brace comprising a brace attachment bar having an end securably attached to a central point of the back edge of the base and extending therefrom in a substantially horizontal plane in a direction toward the front edge thereof, a brace attachment arm that is continuous with the brace attachment bar and is perpendicular to the frame and the base; a wreath stabilizing arm attached to the brace attachment arm and extending therefrom in a substantially horizontal plane arrayed above and parallel to a plane of the frame by a distance sufficient to stabilize the bottom of the wreath in the substantially vertical display alignment, the wreath stabilizing arm further extending away from the back edge of the frame and toward the front edge thereof; and a second wreath stabilizing arm attached to the brace attachment arm and extending therefrom in a substantially horizontal plane arrayed between and parallel to the horizontal planes of the frame and the base by a distance sufficient to further stabilize the bottom of the wreath in the vertical display alignment, the second wreath stabilizing arm further extending in a direction away from the back edge of the frame and toward the front edge thereof;

and further comprising a cantilever wreath support permitting the wreath in conjunction with the stand to be displayed in the vertical display alignment on a pegboard, the cantilever wreath support further comprising:

a peg board bracing element attached to the peg board;

a wreath support element that is continuous with the peg board bracing element and is perpendicular thereto; and a wreath bracing element that is continuous with the wreath support element at an end furthest from the peg board bracing element, and is perpendicular to the wreath support element, wherein the wreath support element is configured such that, when the peg board bracing element is attached to the peg board, the wreath support element extends in a substantially horizontal manner in a direction away from the peg board, and the wreath bracing element extends vertically in an upward direction;

the wreath support element has a length sufficient to permit a wreath in its vertical display alignment in conjunction with the stand to be hung on the cantilever wreath support while maintaining the vertical display alignment;

the wreath bracing element has a length sufficient to prevent the wreath from falling off the wreath support element of the cantilever wreath support when the wreath in conjunction with the stand is hung thereon in the vertical display alignment;

wherein each of the support extensions is securably attached to a lateral edge of the base at a point such that the support extensions also contact and are securably attached to the back edge of the frame; and wherein each of the wreath attachment arms includes a horizontal resting portion extending from the support extension in a direction toward the front edges of the base and the frame, and a vertical bracing portion perpendicular to and extending upwardly from the resting portion.

* * * * *